APPARATUS FOR MEASURING CHARACTERISTICS OF MATERIALS

INVENTORS:
GEORGE H. HARE
EVERETT W. MOLLOY
BY THEIR ATTORNEYS
HARRIS, KIECH, FOSTER & HARRIS
By [signature]

INVENTORS:
GEORGE H. HARE
EVERETT W. MOLLOY
BY THEIR ATTORNEYS
HARRIS, KIECH, FOSTER & HARRIS
By [signature]

United States Patent Office 2,724,798

Patented Nov. 22, 1955

2,724,798

APPARATUS FOR MEASURING CHARACTERISTICS OF MATERIALS

George H. Hare, Pasadena, and Everett W. Molloy, Wilmar, Calif., assignors to Beckman Instruments, Inc., South Pasadena, Calif., a corporation of California Application January 26, 1952, Serial No. 268,434

16 Claims. (Cl. 324—61)

The present invention relates to an electrical apparatus for detecting and measuring certain changes in the properties of materials, such as conductivity, dielectric constant, and other characteristics related thereto. Many materials exhibit significant variations in their electrical characteristics with variations in composition, an example being the variation in electrical conductivity with variation in solution concentration. In this connection, the invention is particularly applicable to titration and may be employed in conjunction with titrating apparatus to determine the end point of a titration and thereby to determine the concentration of a sample. Consequently, the invention will be considered in connection with the determination of solution concentrations, although it will be understood that various other applications of the invention are possible without departing from the spirit thereof.

In general, the present invention includes coupled, oscillator and load circuits, the former being a resonant circuit and the latter being a capacitively or inductively tuned circuit having the load, such as a capacitively coupled solution, connected thereto. Preferably, capacitive coupling between the oscillator and load circuits is used, although resistive and inductive coupling are also possible. Also, the oscillator circuit, while shown hereinafter as of the parallel resonant type, may be of the series resonant type also. While oscillator frequencies outside this range may be employed, the oscillator frequency is preferably of the order of 5 to 10 megacycles. In this frequency range, simplicity of construction and excellent oscillator stability in both frequency and amplitude are easily obtained.

The invention also contemplates a measuring means, preferably a vacuum tube voltmeter, which is connected to the oscillator and load circuits and which is sensitive to differences between the magnitudes of the oscillator voltage and the voltage across the load circuit, the latter being tuned by a tuning condenser therein and being excited through a coupling condenser which couples the oscillator and load circuits.

It is an important object of the invention to insure that the coupling adjustment between the oscillator and load circuits shall always be somewhat less than the critical value, whereby even in use by unskilled personnel and those unfamiliar with the properties of tuned circuits, the undesirable effects of overcoupling are prevented.

In achieving the aforementioned object, the circuit sacrifices some of the available amplitude across the load circuit and, correspondingly, a certain degree of available sensitivity. However, this is more than compensated for in that errors resulting from substantially critical coupling, or overcoupling, which make it difficult or impossible to duplicate results in tests made at different times on the same materials are avoided.

An important object of the invention is to avoid overcoupling by using only a fraction of the voltage across the coil or inductor of the oscillator circuit as the reference signal for the vacuum tube voltmeter, this being accomplished by connecting the voltmeter to the oscillator circuit at a point of intermediate oscillator voltage.

Another important object of the invention is to provide a receptacle for the sample material, such as a solution, wherein the solution is capacitively coupled into the load circuit and which has very stable dimensions, both with respect to the position of the receptacle in space and the geometry and spacing of the electrodes for coupling the solution to the load circuit.

In the past, many have mistakenly resorted to inserting a test tube containing the desired solution inside a coil excited with high frequency. This procedure results in extremely low sensitivity and requires the use of positive feed-back, or regeneratively connected circuits, which intensify the inherent instability of the associated vacuum tubes. Others have suggested the use of electrodes in the form of metallic foil wrapped around the receptacle for the desired solution, but such foil electrodes are not stable insofar as their geometry and spacing are concerned. Also, contamination occurring between the foil electrodes and the receptacle may influence the dielectric constant of the structure.

In view of the foregoing, an important object of the invention is to provide electrodes for capacitively coupling the solution to the load circuit which are plated on the exterior of the receptacle so that the electrodes are stable, both with respect to their geometry and their spacing. The receptacle may be formed of any suitable dielectric material, such as glass, and may take the form of a beaker, for example, having the two electrodes plated on the exterior thereof.

Another object is to provide a receptacle having vertically spaced electrodes plated on the exterior thereof, the upper electrode preferably being an annular band extending around the receptacle and spaced upwardly from the bottom thereof. The lower electrode may merely be a metallic spot plated on the bottom of the receptacle at the center thereof. In this connection, an important object of the invention is to connect the band electrode to ground, the spot electrode on the bottom of the receptacle being the high voltage electrode. With this construction, the radio frequency field within the receptacle exists chiefly in the lower zone only of any solution which may fill the receptacle. Thus, as the upper zone of the receptacle and the band electrode around it are at ground potential, this results in considerable freedom from electrical interaction between the high voltage or spot electrode and its surroundings. Particularly, the high voltage electrode is shielded from the operator, who may manipulate a burette, or otherwise move his hands in the vicinity of the receptacle, without seriously disturbing the circuit readings, which is an important feature of the invention.

Another object of the invention is to provide means associated with the load circuit for compensating for the effect of temperature variations on the Q of the load circuit. More particularly, an object in this connection is to provide a temperature-compensating means which includes an inductor, a capacitor and a resistor in series, the inductor of the temperature-compensating means being inductively coupled with the inductor of the load circuit.

The foregoing objects and advantages of the present invention, together with other objects and advantages thereof which will become apparent, may be attained with the exemplary embodiment of the invention which is illustrated in the accompanying drawings and which is described in detail hereinafter. Referring to the drawings.

Figures 1, 2:
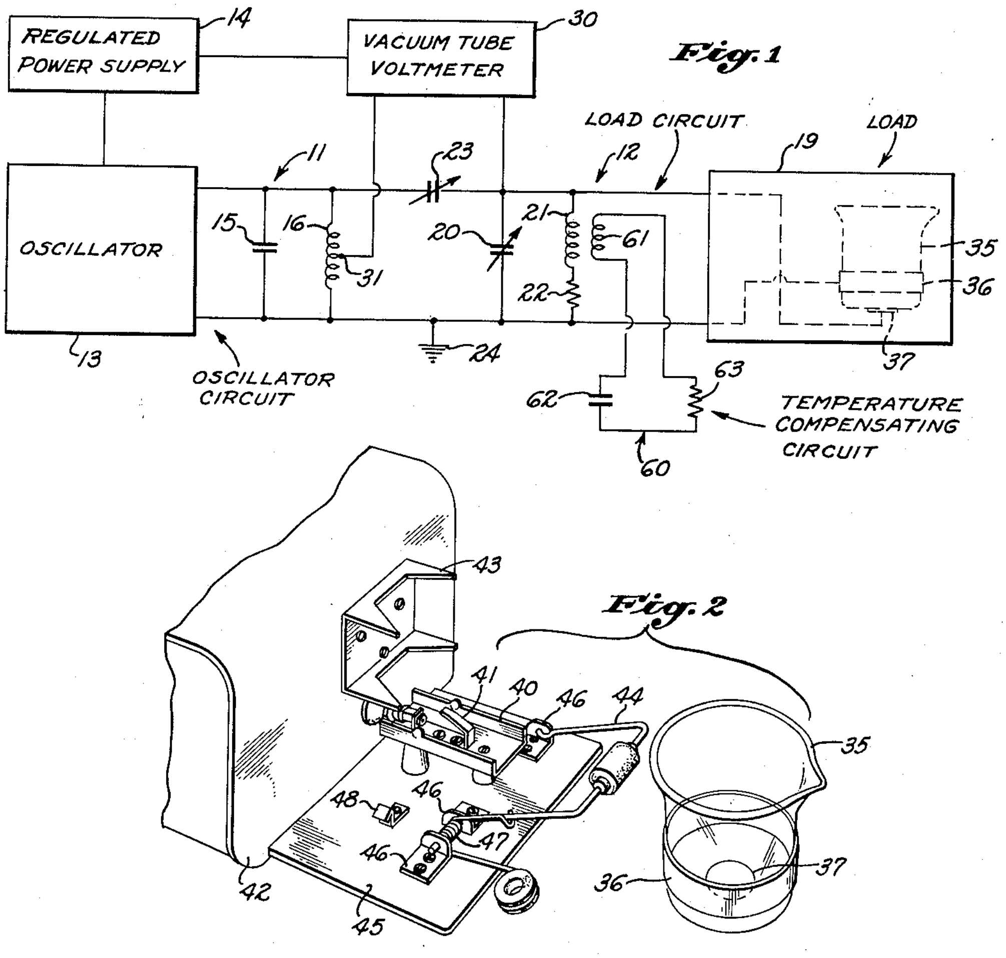
Fig. 1 is a diagrammatic view of the electrical circuitry of an electrical measuring instrument or apparatus of the invention.
Figs. 2 and 3 are fragmentary perspective views of the apparatus or instrument of the invention, Fig. 2 showing a solution receptacle disassembled from the instrument in Fig. 3 showing the receptacle assembled with the instrument.

Referring particularly to Fig. 1 of the drawings, the electrical circuitry of the measuring instrument of the invention includes capacitively coupled, parallel resonant, oscillator and load circuits 11 and 12 in the particular construction illustrated. The oscillator circuit 11 includes an oscillator 13 with a frequency output of, for example, 5 to 10 megacycles, although frequencies outside of this range may also be employed. The oscillator 13, which may be any of a number of suitable circuits well known to the electronic art, is powered by a regulated power supply 14. The oscillator circuit 11 includes a capacitor 15 and an inductor or coil 16 in parallel in the particular construction illustrated to form a parallel resonant circuit. The load circuit 12 includes a load 19, an example of which will be considered hereinafter, and includes a variable capacitor 20 and an inductor or coil 21 connected in parallel so that the load circuit is also parallel resonant in the particular construction illustrated. A resistor 22 is shown as connected in series with the coil 21, however this may be understood to represent not a discrete element, but the resistance inherent in the inductor 21. The two resonant circuits 11 and 12 are capacitively coupled in the particular construction illustrated by a variable coupling condenser 23, whereby the load circuit is excited. A connection to ground potential is provided at 24.

A suitable measuring means, preferably a vacuum tube voltmeter 30, is powered by the power supply 14 and is connected to the oscillator and load circuits 11 and 12. The voltmeter 30, which may be of any suitable construction, employs a stable balanced circuit and is so connected to the oscillator and load circuits as to be sensitive to differences between the magnitude of the tapped fraction of the oscillator voltage and the magnitude of the voltage across the load circuit 12 as tuned by the condenser 20 and affected by the nature of the load 19. The voltage difference so sensed is to be distinguished from a measurement which determines the vector difference of the two signals.

An important feature of the present invention resides in assuring that, as the coupling between the oscillator circuit 11 and the load circuit 12 is adjusted toward maximum sensitivity of circuit response, the final adjusted value shall always be somewhat less than the critical value. With the particular construction illustrated, wherein the coupling capacitance is small compared to load circuit tuning capacitance, critical coupling may be defined as the condition resulting when the capacitance of the coupling capacitor 23 is equal to the load circuit tuning capacitance divided by the Q of the load circuit. The load circuit tuning capacitance is here understood to be the sum of the tuning capacitance 20 and the equivalent capacitance of the load circuit itself.

If, on the other hand, overcoupling occurs, i. e., if the capacitance of the coupling capacitor 23 exceeds the critical value defined in the preceding paragraph, the sensitivity of the over-all circuit to variations in the conductance of the load 19 will be decreased. As the conductance of the load is varied over a wide range of values when the instrument is in use, as when analyzing electrolytes of widely varying concentrations, the capacitance of the coupling capacitor 23 must be correspondingly adjusted. In practice, the Q of the load circuit 12 may vary from approximately 200 to about 20, for example, the highest values being achieved either with very dilute solutions, or with very concentrated solutions in the load circuit. As an example, the minimum Q of the load circuit with sodium chloride is found at a concentration of about 0.0003 N at 25° C. If the capacitance of the coupling capacitor were fixed to provide critical coupling at the highest Q values for the circuit, then, for the lowest Q values, the load circuit voltage would be only approximately one tenth as large as it would be if the coupling were then adjusted so that the maximum amplitude could be attained for the minimum Q. Conversely, if the coupling capacitor were fixed at a capacitance value to produce optimum sensitivity at the lowest Q, then as the load Q is increased to its highest value, the resulting overcoupling would materially decrease the sensitivity of the circuit.

Conventional practice when producing critical coupling between two circuits, such as the oscillator and load circuits 11 and 12 illustrated, would call for computing the value of the capacitance of the coupling capacitor 23 on the basis of the known tuning capacitance and Q of the load circuit, or to adjust the value of the capacitance of the coupling condenser to the proper point by actually observing the electrical response of the circuits as the frequency is varied, or by some other equally complex method. Since the instrument of the present invention will frequently be used by chemists and others having little knowledge of electronics, such procedures for determining the proper value of the capacitance of the coupling capacitor 23 are undesirable, wherefore an important object of the present invention is to provide a means for automatically assuring somewhat less than critical coupling which requires no knowledge of the over-all circuit response, or complex auxiliary equipment.

At the condition for critical coupling, the voltages across the oscillator and load coils 16 and 21 are substantially equal and this would represent the optimum condition of use and adjustment of the circuit in conductometry. However, since in conditions of over-coupling, the voltages of the two resonant circuits are also substantially equal, an operator having little or no knowledge of the requirements of the system frequently might choose a value for the capacitance of the coupling capacitor 23 far in excess of that required for critical coupling. This would result in a particularly insidious type of error, inasmuch as results might not be duplicated in independent runs on the same materials. Furthermore, it has often been observed that if the coupling is at the critical value, or very close thereto, an instability in the oscillator output level may be observed, wherein this level changes abruptly from one level to another as the load circuit is tuned through resonance. This phenomenon, which may likewise result in errors of measurement, is therefore also eliminated when coupling is adjusted to a value somewhat less than the critical value.

In view of the foregoing in comparing magnitudes of oscillator and load circuit voltages, we connect the vacuum tube voltmeter 30 to a point of intermediate oscillator voltage, such as the point 31, on the coil 16 of the oscillator circuit 11. This results in the application to the voltmeter 30 of a reference signal which is only a fraction of the oscillator coil voltage. Accordingly, the value of the capacitance of the coupling capacitor 23, when the voltmeter is balanced, corresponds, in general, to the same fraction of the capacitance value for critical coupling. Consequently, if the circuits 11 and 12 are overcoupled, i. e., if the value selected for the capacitance of the coupling capacitor is too high, the indicator, not shown, of the vacuum tube voltmeter 30 is deflected to one side of zero. Similarly, if the capacitance value selected is too low, the vacuum tube voltmeter 30 is unbalanced in the opposite direction. This structure sacrifices some of the available amplitude across the load circuit 12 and thus reduces sensitivity somewhat, but it insures that the operator will always adjust the circuit to somewhat less than critical coupling, which is an important feature of the invention.

It will be understood that while the voltmeter 30 has been shown as connected directly to the coil 31 to obtain an intermediate oscillator voltage, the same thing may be accomplished by connecting the voltmeter to an intermediate point on a resistor in parallel with the coil 31, or to a point between series connected capacitors in parallel with the coil 31, or the like.

While the measuring instrument hereinbefore described may be used in connection with materials other than solutions, it is particularly applicable to solutions and the coupling to the solution will now be considered. Previously, investigators have inserted a tube containing the sample within the inductor coil in the mistaken belief that good coupling could be effected through the magnetic field. However, we have found that this is not the case and that the mode of coupling even when the sample is inserted in the coil, is primarily capacitive, at least at the comparatively high solution dilutions normally encountered.

Figure 3:
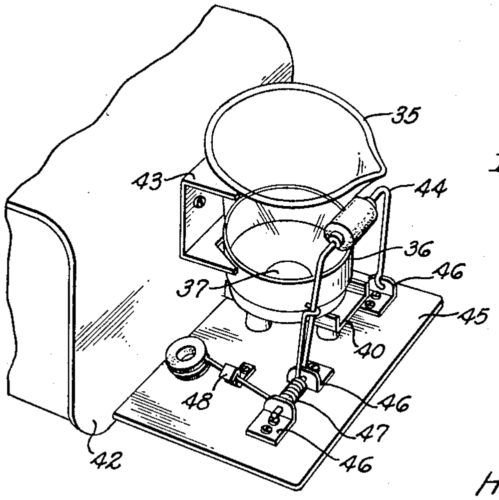

Accordingly, it is possible to increase greatly the sensitivity of the instrument by designing it explicitly for optimum capacitive coupling of the sample to the circuit. Capacitive coupling requires that electrodes be employed to couple the load circuit 12 to the solution. However, since the electrodes can themselves be capacitive elements, i. e., separated from the sample by a dielectric, the system can be made virtually electrodeless in the sense of not requiring electrodes to be inserted into the sample. An important consideration is that the solution, or other sample material, be contained in a receptacle of very stable dimensions, this being true both of the position of the receptacle in space and the geometry and spacing of the electrodes. We have found that the use of electrodes plated on the exterior of a receptacle of dielectric material, together with simple means for accurately positioning the receptacle in space, provide an inexpensive and entirely satisfactory solution to the problem. Referring particularly to Figs. 2 and 3 of the drawings, the receptacle may be an ordinary beaker 35 of heat-resistant glass, although receptacles of other shapes and other dielectric materials may be employed. Plated on the exterior of the beaker 35, as by being fired thereon, are electrodes 36 and 37, the electrode 36 being an annular band spaced above the bottom of the beaker and the electrode 37 being a spot on the bottom of the beaker. Various materials, such as copper, silver, gold, or other conductive substances, may be employed for the electrodes 36 and 37. As an example, assuming that the beaker 35 is approximately 2¾″ in diameter and approximately 3½″ high, the band electrode 36 may be located about ⅜″ above the bottom of the beaker and may be about 1½″ wide, the diameter of the spot electrode being about 1¼″ under such conditions. However, it will be understood that other values may be employed. With this construction, the geometry and spacing of the electrodes 36 and 37 is extremely stable, which is an important feature of the invention. Also, the cost of firing such electrodes onto standard chemical beakers of heat-resistant glass amounts to only a few cents per unit, which is another important feature.

Considering the manner in which the beaker 35 may be stably positioned in space, the numeral 40 in Figs. 2 and 3 of the drawings designates a relatively rigid, insulated support on which the beaker may be placed, the support carrying a terminal 41 which engages the spot electrode 37 when the beaker is placed on the support. Mounted on a wall 42 of the instrument is a terminal element 43 having two pairs of arms which embrace the beaker 35 when it is placed on the support 40. The lower pair of arms of the terminal element 43 engages the band electrode 36, the terminal element being electrically connected to the wall 42, which forms part of the case of the instrument, so that the band electrode 36 is caused to be at ground potential. These connections are shown diagrammatically in Fig. 1 of the drawings.

The terminal 41 is preferably a spring to provide for good terminal contact with the spot electrode 37. Also, the beaker 35 is preferably biased firmly into engagement with the terminal element 43 to provide good electrical contact between the lower pair of arms of the terminal element and the band electrode 36. For this purpose, a clamp 44, pivotally connected to a base 45 on which the support 40 is mounted by bearing elements 46, is adapted to hold the beaker 35 firmly against the terminal element 43. Associated with the pivoted clamp 44 is a rat trap spring 47, one end of which is hooked around the clamp and the other end of which is adapted to engage a latch 48 to firmly hold the clamp against the beaker. Thus, with this construction, the beaker is accurately located in space.

As discussed above, and as illustrated diagrammatically in Fig. 1 of the drawings, the band electrode 36 is at ground potential while the spot electrode 37 on the bottom of the beaker serves as the high voltage, high frequency electrode. Thus, since the grounded band electrode 36 is relatively wide, the high frequency field inside the beaker exists chiefly only in the lower zone of any solution which may fill the beaker. Thus, as the upper zone of the beaker and the band electrode 36 around it are at ground potential, this results in considerable freedom from electrical interaction between the high voltage electrode 37 and its surroundings. Particularly, the high voltage electrode is shielded from the operator, who may manipulate a burette, or otherwise move his hands in the vicinity of the beaker, whereby the presence of the operator does not seriously disturb the observed readings. Also, the terminal 41 for the spot electrode 37 is of a size comparable to that of the spot, whereby the rotational position of the beaker on its support does not produce any changes in stray capacity between the spot electrode and its surroundings.

Thus, the present invention provides a receptacle whose dimensions are stable, both with respect to its position in space and the geometry and spacing of its electrodes. Further, by making the upper, band electrode 36 the grounded electrode, interference is minimized, all of which are important features of the invention.

It will be understood that while the externally electroded beaker 35 provides a preferred means of coupling a solution to the measuring instrument of the invention, the solution may be capacitively coupled thereto in other ways, as by employing an electrode assembly which may be placed in a suitable receptacle containing the sample, the electrodes in such an assembly being coated with a dielectric material, such as glass, or a suitable plastic.

Figure 4:
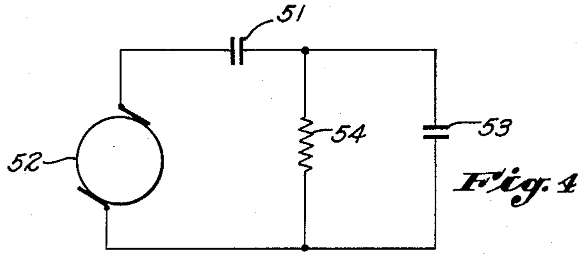
Fig. 4 is a diagrammatic view of the equivalent electrical circuit of a solution adapted to be capacitively coupled to the instrument or apparatus of the invention.

Referring to Fig. 4 of the drawings, illustrated therein is an equivalent electrical circuit representing the beaker 35, the electrodes 36 and 37 and a solution in the beaker in diagrammatic form. In this equivalent circuit, a capacitance 51 represents the combined capacitance existing between the electrodes 36 and 37 and the body of solution, the wall of the vessel being the effective dielectric. The capacitor 53 and the resistor 54 represent the equivalent circuit of the solution itself. The combined electrode capacitance 51 couples the solution circuit to a generator 52. Considering an example, since the dielectric constant of water is essentially unchanged over very wide frequency in concentration ranges, the capacitance 53 is constant within a few per cent. The value of the resistance 54, on the other hand, is inversely proportional to the conductivity of the solution. The capacitance 51 represents the principal series impedance of the circuit, and, therefore, it is the chief element determining the current flowing in the circuit. At any particular frequency, as the value of the resistance 54 is varied by changing the solution concentration, its power absorption will vary and pass through a maximum. At high solution concentrations, the resistance 54 has so small a value that practically all the current may pass through it and very little of the current passes through the condenser 53. The Q of the total load circuit is then high, and the voltage across the load circuit may approach that across the oscillator coil. However, the power absorption of the resistance 54 increases with decreasing concentration, i. e., with increasing resistance, and the voltage across the load circuit is correspondingly diminished. At still higher dilutions, however, the capacitance 53 starts to pass the majority of the current, hence a smaller proportion is available for power dissipation. Thus, losses in the circuit fall again, and the Q and voltage of the load circuit rise to higher values. Thus, power losses in the circuit are at a minimum and voltage at a maximum at both extremes of the concentration range.

Figure 5:
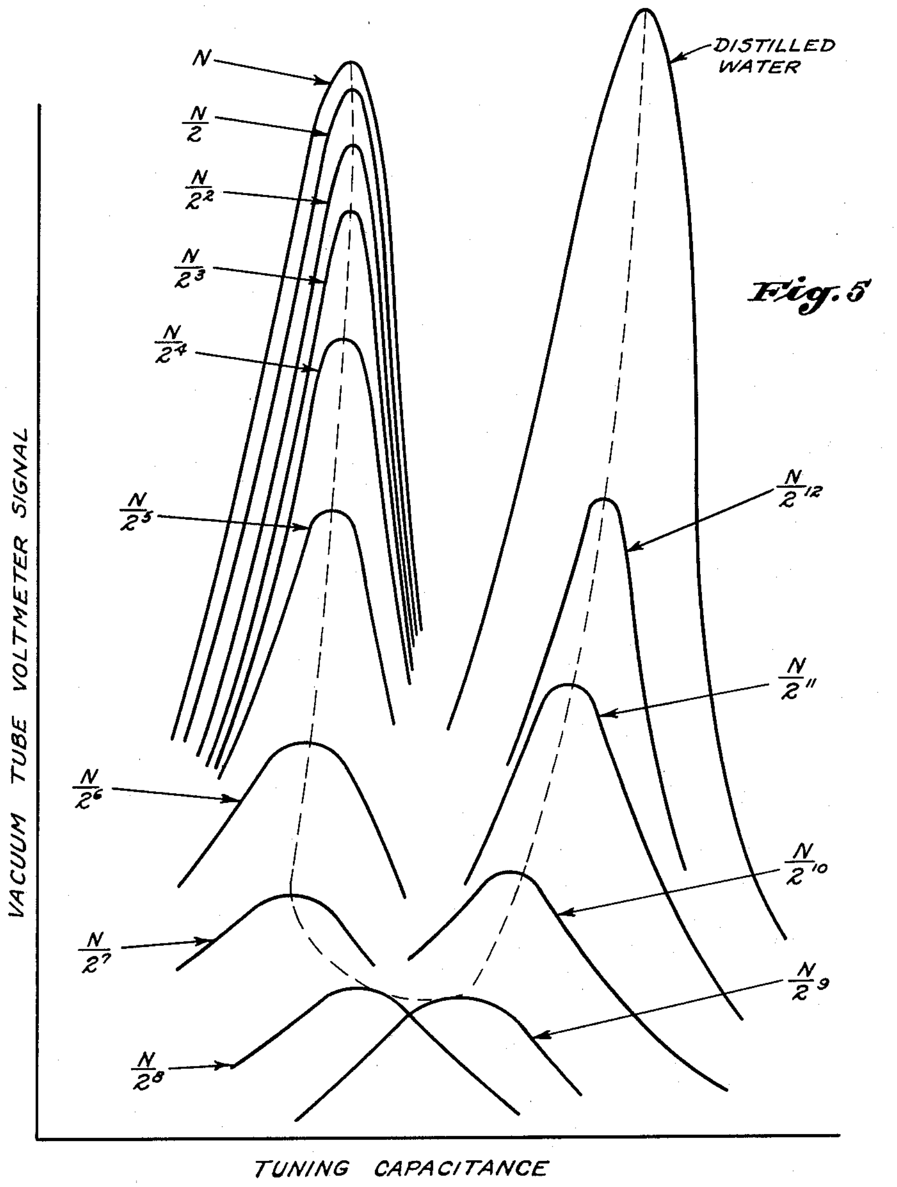
Fig. 5 is a chart illustrating the operation of the invention.

The curves of Fig. 5 show qualitatively the manner in which the voltage across the load circuit 12 varies with tuning capacity as the solution concentration is changed. The curve labeled "N" represents the characteristic of an electrolyte of 1 N concentration, while the successive curves are representative of successive twofold dilutions of the same material, the final curve being that of infinite dilution, i. e. "distilled water."

At either high or low concentrations, good sensitivity to change in concentration is found at the peak values of the tuning curves. Since the peaks are insensitive to small variations in tuning capacitance at the high or very low concentrations, it is desirable to take the voltmeter readings while tuned to the peaks, as less interference from operator capacity and other effects results.

Near the middle of the concentration range, the attainable peak amplitude goes through a minimum, as does likewise the difference in peak level observable for small differences in concentration. Here, sensitivity must be attained by working on the sides of the tuning curves. High sensitivity is maintained nevertheless because in this range of concentration the equivalent shunt capacitance of the solution is changing rapidly.

By taking advantage of both of these effects, the measuring instrument of the invention gives useful sensitivity over a wide concentration range.

It will be apparent that when working on the sides of the tuning curves, the instrument is extremely sensitive to changes in dielectric constant, and may be employed to detect concentration changes in organic solutions, for example, where changes in dielectric constant may be an appreciable function of composition.

The use of similar resonant oscillator and load coil circuits provides an important advantage in making the meter indication stable against small variations such as may occur in the oscillator frequency. However, another type of instability exists in that the meter tends to become unbalanced as the result of the effects of temperature changes on the Q of the load circuits 11, inasmuch as analysis shows that meter response is proportional to the fractional change of load circuit Q.

In view of the foregoing, the present invention provides a temperature compensating means 60 having the form of an auxiliary tuned circuit, tuned to the oscillator frequency, which is critically coupled to the load coil 21, as shown in Fig. 1 of the drawings. The auxiliary circuit 60 includes an inductor or coil 61 inductively coupled with the load coil, and includes a capacitor 62 and a resistor 63 in series with the coil 61. Actually, the resistors 22 and 63 are not necessarily separate resistors, but may be the inherent resistances of the material of which the coils 21 and 61 are made, this being preferably copper.

Now, the Q of a coil in series with a resistance is given by the ratio of the reactance to the series resistance whereas the Q of a coil in parallel with a resistance is given by the ratio of the resistance to the reactance. Consequently, if both of the resistances have, for example, positive temperature coefficients, in the first case the Q will decrease with temperature, and, in the second case, it will increase with temperature. Therefore, if the auxiliary tuned circuit 60 be regarded as forming a transformer with the load coil 21, the series resistance inherent in the auxiliary circuit can be regarded to be transformed by the square of the turns ratio of the two coils and to exist in parallel with the load coil. Thus, this transformed parallel resistance may be considered to decrease while the inherent series resistance of the load coil increases with temperature, thereby providing compensation against changing effective Q.

Actually, the foregoing explanation of the effect of the temperature compensating circuit 60 is only qualitative. Analyzing the effect of the temperature compensating circuit further, this circuit can be treated as an impedance in series with the load coil 21, the value of this impedance being given by the equation $$\frac{\omega^2 M^2}{Z_a}$$

where $\omega M$ may be considered the mutual reactance between the two coils and where $Z_a$ is the total series impedance of the auxiliary circuit. It can be shown from modifications of this expression based on the assumption of critical coupling between the auxiliary, temperature-compensating circuit 60 and the load circuit 12, that if the auxiliary circuit is exactly tuned to the frequency of the system, then the impedance which it produces in series with the load coil 21 is represented by a pure resistance whose magnitude is equal to the series resistance of the load coil. Changes in temperature in the system cause this reflected series resistance to vary inversely with temperature. Thus, the total effective resistance determining the Q of the load coil may be represented by an expression of the form $$r+\frac{r_0^2}{r}$$

where $r_0$ is the resistance at the reference temperature, and $r$ is the effective resistance at any given temperature, of each of the two resistors effectively in series. If this expression is differentiated with respect to $r$, the expression $$1-\frac{r_0^2}{r^2}$$

results. This term is clearly small as long as the actual value of resistance is not very different from the reference value $r_0$. As a matter of fact, for a range of ±30°, the maximum value of temperature coefficient in the combination remains less than 0.1% per ° C. For a range of only ±10° C. the coefficient is very much smaller still. This means of temperature compensation can thus result in a reduction of the effective temperature coefficient of the coil by a factor of 5 for large changes in temperature, and by a very much larger factor for moderate changes in temperature. In any event, compensation is achieved at the sacrifice of only a factor of two in the operating Q of the load coil 21.

Although we have disclosed an exemplary embodiment of our invention herein for purposes of illustration, it will be understood that various changes, modifications and substitutions may be incorporated in the embodiment disclosed without departing from the spirit of the invention.

We claim as our invention:

1. In an apparatus for measuring a characteristic of a material, the combination of: a resonant input circuit and an output circuit tunable to resonance with said input circuit and coupled thereto; and voltage measuring means connected between said output circuit, and a point of intermediate potential on said input circuit, said voltage measuring means being responsive to the difference in potential between said output circuit and said point of intermediate potential.

2. In an apparatus for measuring a characteristic of a material, the combination of: a resonant oscillator circuit and a load circuit tunable to resonance with said oscillator circuit and coupled thereto, each circuit including an inductor; and a voltmeter connected to said oscillator and load circuits, said voltmeter being connected to said oscillator circuit at a point of intermediate oscillator potential and being responsive to the voltage difference between said point of intermediate oscillator potential and said load circuit.

3. In an apparatus for measuring a characteristic of a material, the combination of: a resonant oscillator circuit and a load circuit capacitively tunable to resonance with said oscillator circuit and capacitively coupled thereto each circuit including an inductor; and a vacuum tube voltmeter connected to said oscillator and load circuits, said voltmeter being responsive to a difference in magnitude of voltage between the respective points of connection, and being effectively connected to said oscillator circuit at an intermediate point on said inductor of said oscillator circuit.

4. In an apparatus for measuring a characteristic of a material, the combination of: coupled oscillator and load circuits each having an inductor therein, said load circuit being a tunable circuit; and a vacuum tube voltmeter connected to said oscillator and load circuits, said voltmeter being effectively connected to said oscillator circuit at an intermediate point on said inductor of said oscillator circuit.

5. In an apparatus for measuring a characteristic of a material, the combination of: a parallel resonant oscillator circuit and a load circuit capacitively coupled thereto, each circuit including an inductor, said load circuit being a tunable circuit; and a vacuum tube voltmeter connected to said oscillator and load circuits, said voltmeter being effectively connected to said oscillator circuit at an intermediate point on said inductor of said oscillator circuit.

6. In an apparatus for measuring a characteristic of a material, the combination of: coupled oscillator and load circuits each including an inductor, said load circuit including a receptacle of dielectric material having spaced electrodes of electrically conductive material plated thereon; and measuring means connected to said oscillator and load circuits, said measuring means being connected to said oscillator circuit at an intermediate point on said inductor of said oscillator circuit.

7. In an apparatus responsive to variations in the conductivity of a liquid, the combination of: a resonant oscillator circuit and a tunable load circuit coupled thereto, each circuit including an inductor, said load circuit including a receptacle for the material a characteristic of which is to be measured, said receptacle being formed of a dielectric material and having spaced electrodes of electrically conductive material plated on the exterior thereof, said electrodes acting to capacitively couple the liquid to the load circuit; and a vacuum tube voltmeter connected to said oscillator and load circuits.

8. An apparatus as defined in claim 7 wherein said electrodes are vertically spaced and wherein the uppermost of said electrodes is connected to ground potential.

9. An apparatus according to claim 7 wherein one of said electrodes is an annular band around the receptacle above the bottom of the receptacle and wherein the other of said electrodes is on the bottom of said receptacle.

10. An apparatus according to claim 9 wherein said annular band is connected to ground potential.

11. A receptacle for use in an apparatus responsive to the conductivity of a liquid and adapted to contain the liquid, said receptacle being formed of dielectric material and having spaced electrodes of electrically conductive material plated on the exterior thereof, one of said electrodes being an annular band around said receptacle above the bottom thereof, and the other of said electrodes being on the bottom of said receptacle.

12. In an apparatus for measuring a characteristic of a material, the combination of: a resonant oscillator circuit and a load circuit coupled thereto each circuit having an inductor therein; measuring means connected to said oscillator and load circuits, said measuring means being connected to said oscillator circuit at an intermediate potential on said inductor of said oscillator circuit; and means associated with said load circuit for compensating for the effect of temperature variations on the Q of said load circuit.

13. In an apparatus for measuring a characteristic of a material, the combination of: coupled oscillator and load circuits each having an inductor therein; measuring means connected to said oscillator and load circuits; and means critically coupled to said inductor of said load circuit for compensating for the effect of temperature variations on the Q of said load circuit.

14. An apparatus as defined in claim 13 wherein the temperature-compensating means includes an inductor, a capacitor and a resistor in series, said inductor of said temperature-compensating means being coupled to said inductor of said load circuit.

15. An apparatus as defined in claim 13 wherein the temperature-compensating means is tuned to the oscillator frequency.

16. In an apparatus for measuring a characteristic of a material, the combination of: capacitively coupled oscillator and load circuits each including an inductor, said load circuit being a tunable circuit and including a receptacle which is adapted to contain the material the characteristic of which is to be measured, said receptacle being formed of dielectric material and having vertically spaced electrodes of electrically conductive material plated on the exterior thereof, the uppermost of said electrodes being connected to ground potential; a vacuum tube voltmeter connected to said oscillator and load circuits, said voltmeter being connected to said oscillator circuit at an intermediate potential on said inductor of said oscillator circuit; and temperature-compensating means including an inductor, a condenser and a resistor in series, said inductance of said temperature-compensating means being inductively coupled with said inductor of said load circuit.

References Cited in the file of this patent

UNITED STATES PATENTS

| | | |
|---|---|---|
| 2,111,235 | Avins | Mar. 15, 1938 |
| 2,137,787 | Snow | Nov. 22, 1938 |
| 2,313,699 | Roberts | Mar. 9, 1943 |
| 2,337,759 | Loughlin | Dec. 28, 1943 |
| 2,373,846 | Olken | Apr. 17, 1945 |
| 2,471,033 | Greeley | May 24, 1949 |
| 2,523,363 | Gehman | Sept. 26, 1950 |
| 2,541,749 | De Lange | Feb. 13, 1951 |
| 2,555,977 | Kline | June 5, 1951 |
| 2,636,928 | Bernard | Apr. 28, 1953 |